United States Patent [19]
Hagiwara et al.
[11] 3,784,754
[45] Jan. 8, 1974

[54] APPARATUS AND METHOD FOR TRANSMITTING AND RECEIVING SIGNALS BASED UPON HALF CYCLES

[76] Inventors: Isamu Hagiwara, 3-1-17, Katamachi, Fuchi-shi, Tokyo; Shiro Okamura, 1494 Jindaijimachi, Chofu-shi, Tokyo, both of Japan

[22] Filed: Feb. 23, 1972

[21] Appl. No.: 228,643

[30] Foreign Application Priority Data

Feb. 23, 1971 Japan .................................. 46/8831

[52] U.S. Cl. .......................................... 179/15.55 R
[51] Int. Cl. .......................................... H04b 1/66
[58] Field of Search .................. 179/1 SA, 15.55 R, 179/15.55 T, 15 A, 15 BW; 328/136

[56] References Cited

UNITED STATES PATENTS

| | | | |
|---|---|---|---|
| 3,104,284 | 9/1963 | French | 179/15.55 T |
| 3,467,783 | 9/1969 | Magniski | 179/15.55 R |
| 3,621,150 | 11/1971 | Pappas | 179/1 SA |
| 3,462,555 | 9/1969 | Presti | 179/15.55 R |
| 3,372,237 | 3/1968 | Hackett | 179/15 BW |
| 3,226,484 | 12/1965 | James | 179/15 BW |
| 3,659,052 | 4/1972 | Slavin | 179/15 BW |

*Primary Examiner*—Thomas W. Brown
*Assistant Examiner*—Jon Bradford Leaheey
*Attorney*—Sandoe, Hopgood & Calimafde

[57] ABSTRACT

Selected portions of an input signal are sampled. Preferably, the portions not sampled are redundant with respect to the sampled portions. This is true if, for instance, the sampled portions are half cycles of a sound wave. The sampled information can be distributed over the time intervals occupied by the sampled and the not sampled portions of the input wave to produce a coded signal having a lower frequency than the original wave. This process can be reversed to substantially reproduce the original wave.

19 Claims, 28 Drawing Figures

APPARATUS AND METHOD FOR TRANSMITTING AND RECEIVING SIGNALS BASED UPON HALF CYCLES

BACKGROUND OF THE INVENTION

This invention relates to signal transmission systems, especially those systems suitable for voice signals. More particularly this invention relates to voice frequency band compression systems and to voice frequency shifting systems.

Frequency band compression of a voice frequency can be used in multiplex communication systems to increase the channel capacity. Heretofore, numerous systems for band compression have been proposed. Many of those known systems have the disadvantages of requiring a large computer system and are not capable of operating in real time.

An object of the present invention is to provide a simple, compact system which is capable of compressing the bandwidth of a signal. Another object of the invention is to provide a system capable of shifting the frequency of a voice signal in a simple manner without distortion.

SUMMARY OF THE INVENTION

According to the present invention, a compressed frequency band signal transmission system comprises means for sampling portions of a sound wave or a similar signal, means for coding the sampled portions, and means for transmitting the coded signal. The sampled portion of the signal may be the positive or negative half cycles of a sound wave. The input wave may be delta modulated before sampling.

Another aspect of the present invention consists of the provision of a compressed frequency band signal transmission system including means for receiving a signal processed as described above, and means for regenerating the sampled portion and the portion not sampled.

According to another aspect of the present invention, a time division multiplex signal transmission system is provided comprising means for sampling portions of a first signal which is a sound wave and has redundancy in the portions not sampled, means for transmitting the sampled portions of the sound wave and means for inserting sampled portions of a second signal between the sampled portions of the first signal.

According to still another aspect of the present invention, a signal transmission system is provided comprising a sampling circuit means for sampling a half cycle of a wave, a buffer memory coupled to the sampling means, an inverter coupled to the buffer memory, and a control means for controlling the sampling means and the buffer memory to produce the wave described above. The sampling position may be predetermined with respect to the zero points of the input wave so as to reproduce the signal more faithfully.

According to another aspect of the invention, a signal transmission system is provided comprising means for removing redundant portions of a sound wave, means for reducing the duration of the wave as described above so that the resulting wave can be transmitted substantially continuously, and then increasing the frequency of the transmitted wave.

According to another aspect of the invention, a signal transmission system is provided comprising means for removing redundant portions of a sound wave, and means for expanding the remaining portions to fill the spaces between the remaining portions whereby the frequency of the sound signal is reduced.

An object of the invention is to provide a signal transmission system in which the voice speed is increased without changing the tone in such a manner that redundant portions of the wave are removed and the unused intervals thereby produced are shortened in duration. According to another aspect of the present invention, a signal transmission system is provided in which the voice speech speed is decreased without changing the tone in such a manner that redundant portions of the wave are continuously added between the original sound wave, and a decrease in the speech speed can be effected by slot reproduction on a sound tape recorder.

According to still another aspect of the present invention, there is provided a signal transmission system in which the frequency band of an audio signal is transformed along the frequency spectrum by removing the redundant portions of the wave and distributing codes representing the remaining portions of the wave over on the time intervals of the removed redundant portions as well as the remaining portions.

According to another aspect of the present invention there is provided a signal transmission system in which the redundant portions of input waves are removed and the time intervals formerly occupied by the removed portions are occupied by other information, thereby forming a multiplex communication system.

BRIEF DESCRIPTION OF THE DRAWINGS

The invention will be described herein in connection with the accompanying drawings in which.

DESCRIPTION OF THE PREFERRED EMBODIMENT

Figure 1:
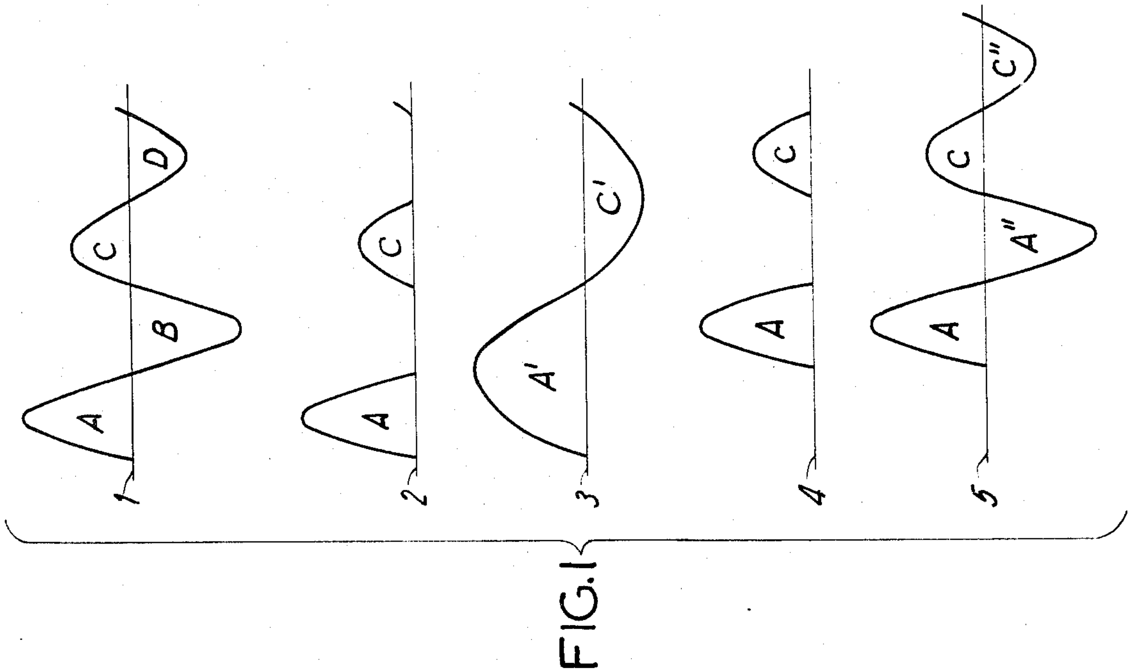
FIG. 1 shows various examples of wave forms that illustrate the principles of the present invention.

FIG. 1 illustrates the principle of the signal transmission system of the present invention. Wave form 1 is of a type which often appears in a voice signal. There we can see an approximate symmetricity of the wave form with respect to the time axis. This symmetricity is especially evident if a sound wave is divided by frequency filters into a plurality of channels. Thus half waves A and C are similar to half waves B and D, respectively, i.e., they are closely correlated. In wave 2, the negative half waves of wave 1 have been removed. Wave 3 is then produced by the expansion of the wave form 2 by a factor of two along the time axis and the compression of the frequency band by a factor of one half. Wave 4 is produced by the compression of the time axis of the wave 3 by a factor of one half and therefore corresponds to the wave 2. Wave 5 is produced by the addition of negative half waves A'' and D'' which are generated by inversion and phase shifting of the positive half waves A and D of wave 4. The wave 3 can be transmitted as a band compressed wave with or without modulation.

Several embodiments are described below in connection with the production of wave 3 from wave 1 and the production of wave 5 from wave 3.

Figure 2:
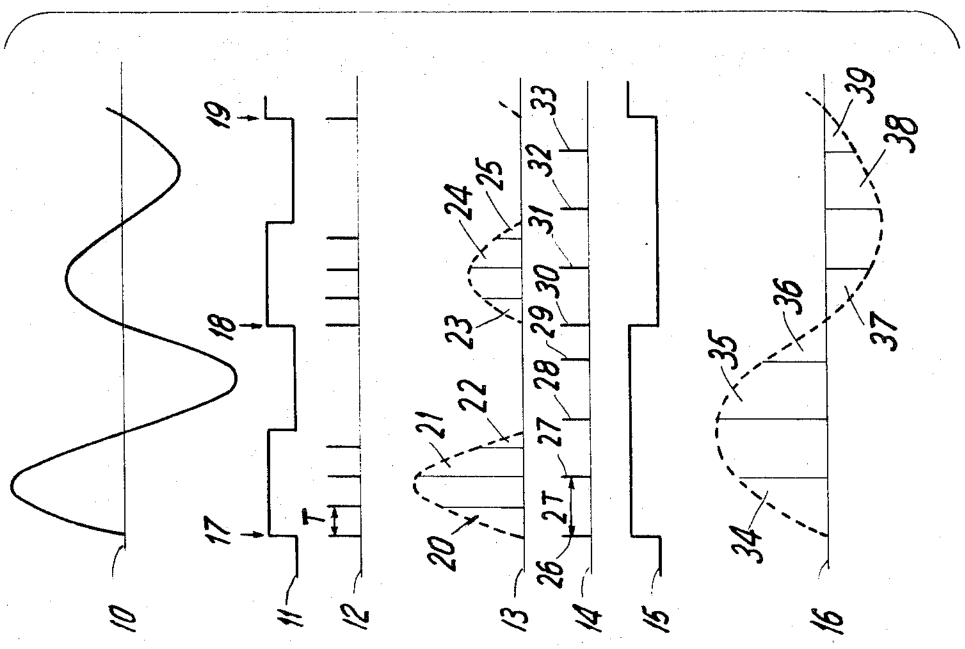
FIG. 2 shows wave forms which illustrate the digital processing of the signals as shown in FIG. 1.

First, a method will be described by which the wave 3, which is the one-half compressed wave, produced from the wave 1. FIG. 2 shows an example of the process, depicted in terms of wave forms. An original wave form 10 is clipped deeply thereby producing the wave form 11, thus providing an indication of the polarity of the input wave 10. Sampling pulses 17, 18 and 19 are produced at times between the leading and trailing edges of the original wave form 10 to produce the wave form 12.

The sampling pulses have a period T. From the sampling pulses 17, 18 and 19, only a portion of the original wave which is of one polarity (positive) is sampled to produce a coded signal or wave 13. These positive half cycles are periodically recurring portions of the input signal 10 defined by the time axis. The negative half cycles which are not sampled contain substantially the same information as the positive half cycles. The sampled pulses 20–25 of the wave 13 are fed to a buffer memory, which may be a digital buffer memory of the analogue-to-digital conversion type or it may be of the analogue type. In the latter case the samples are fed directly. A pulse series 14, with a period 2T, is produced similarly with pulses 26–33 starting from times 17, 18 and 19. Pulse 27 reads out the signal 20 stored in the buffer memory, i.e., it determines the constructing order of the output. Similar pulses 28, 29, 31, 32 and 33 are used to read out the signals 21, 22, 23, 24 and 25, respectively, from the buffer memory, and they also serve as order pulses.

A wave 16 is produced from the constructed output as described above and gated by a gating pulse 15 which is produced from the wave 11 by, for example, a flip-flop circuit. This wave 16 is a coded signal which is distributed over the time intervals occupied by the not sampled portions of the input signal 10 (the lower half cycles) as well as the interval occupied by sampled portions (the upper half cycles). The wave 16 is shifted to the left for convenience. Signals 34, 35 and 36, and signals 37, 38 and 39 correspond to signals 20, 21 and 22, respectively.

Figure 3:
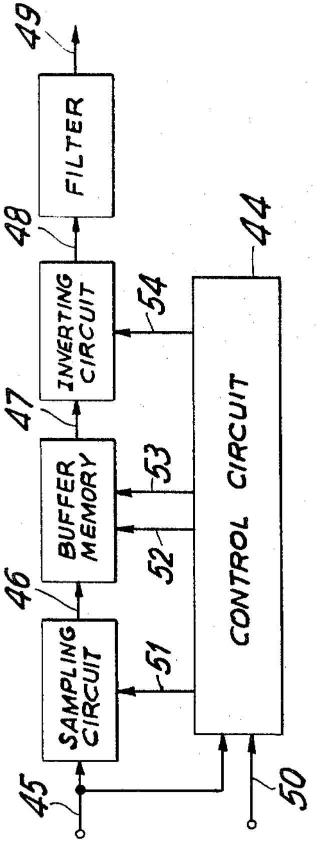
FIG. 3 is a schematic drawing of an exemplary apparatus which produces the wave form 3 from the wave form 2 of FIG. 1.

FIG. 3 is a block diagram of an exemplary apparatus for the production of the above wave forms. Its control means 44 is shown in greater detail in FIG. 4. The reference numeral 45 designates the input terminal, and the wave 10 of FIG. 2 is fed thereto and thus to a sampling means 40 which is responsive to the instantaneous amplitude of the selected portions of the input signal which it samples. The wave form at lead 46 is derived from the sampling circuit 40 and corresponds to the wave form 13 in FIG. 2. A buffer 41 memory is fed the output signal from the sampler 40. Circuits 40 and 41 are controlled by the control means 44 which is regulated by clock pulses supplied to an input terminal 50. The wave 10 is also fed to control circuit 44. An inverting circuit 42 controlled by the circuit 44 produces an output at lead 48 which corresponds to the wave 16 in FIG. 2. A low or band-pass filter or an integrator 43 is connected to the output of inverter 42 to reproduce that signal. The lead 51 feeds a wave having the shape of the wave 12 in FIG. 2 to the sampler 40.

Figure 4:
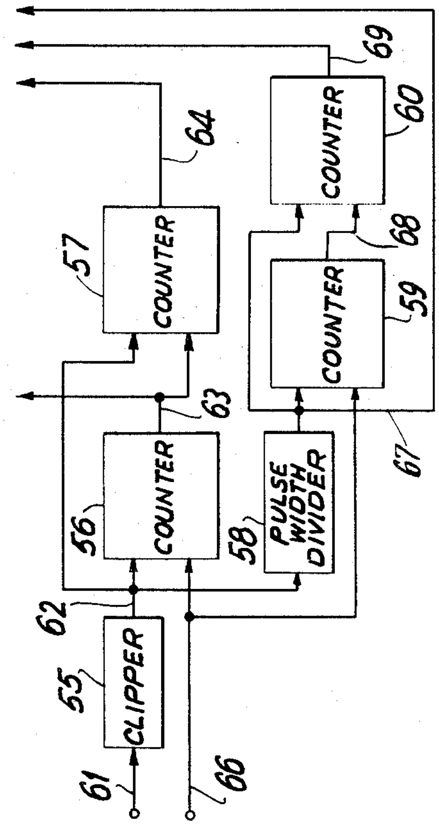
FIG. 4 shows, in greater detail, the block 44 of FIG. 3.

FIG. 4 shows an example of the control unit 44 of FIG. 2, in which an input terminal 61 is connected to the input terminal 45 of FIG. 3 to receive the wave form 10 shown in FIG. 2. This input is supplied to a deep clipper or a polarity discriminator 55 to produce the wave 11 of FIG. 2. A pulse counting circuit 56 is provided in which the upper terminal 62 is the reset terminal and the lower terminal 66 is the input terminal for the signal to be counted. The lead 66 corresponds to the terminal 50 in FIG. 3. The output lead 63 of the counter 56 produces the wave 12 of FIG. 2. The lead 63 corresponds to the lead 51 in FIG. 3. Another counter 57 feeds its output to the buffer memory 41 of FIG. 3. A circuit 58 produces a gating signal 15, shown in FIG. 2, which corresponds to a duration of one period of the original wave. The output signal of the circuit 58 feeds a counter 59 together with the signal from the lead 66. The output of the counter 59 feeds still another counter 60 together with the signal from the lead 67 to produce a control signal of the buffer memory 41. The lead 67, which corresponds to lead 54 in FIG. 3, is connected to the invertor 42 of FIG. 3.

Figure 5:
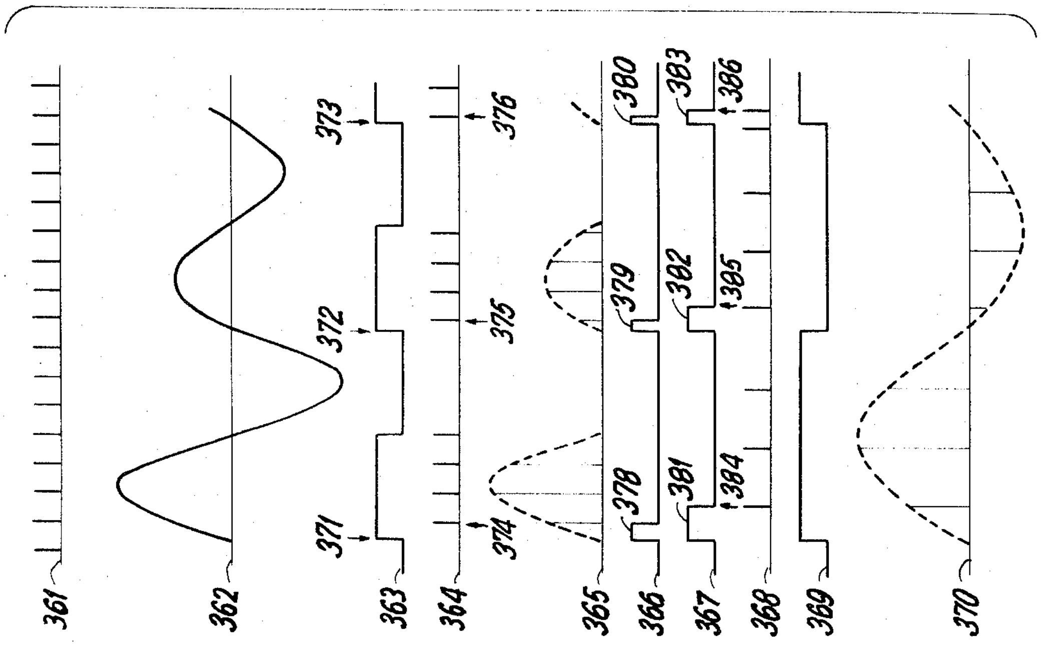
FIG. 5 shows an example of sequencial wave forms by which wave form 3 can be produced from the wave form 1 of FIG. 1.

FIG. 5 shows another process to produce a frequency compression of a wave by one half. The sampling is performed with a period T as before. In this case, however, the interval between the first zero point and the first sampling pulse is counted, and this interval is doubled while the expanded signal is constructed. This avoids the error in the zero point of the elongated signal 3 of FIG. 1. Thus, the original wave is sampled during its positive half period with the sampling period T. The time intervals between the first zero points 371, 372, 373, ... and the first sampling pulses 374, 375, 376, ... are counted resulting in a pulse series 366 comprising pulses 378, 379, 389, ... Each pulse in the series is doubled in width as shown by pulse series 367 comprising pulses 381, 382, 383,.... From the trailing edges of these pulses, a read out pulse series 368 is produced to order the construction of the output signal from the buffer memory. The pulse series 368 corresponds to the wave 14 in FIG. 2, and from this series 368 a compressed band wave 370 is produced in much the same manner as described with reference to FIG. 2. The difference between the process of FIG. 2 and that of FIG. 5 lies in the starting point of the sampling. Thus, in the case of FIG. 2 the sampling is commenced at zero points 17, 18, 19, .... However, in the case of FIG. 5 the sampling is commenced at points spaced from the zero points. In the case of FIG. 2 it is necessary only to extend the interval of the signal by the factor two. In the method of FIG. 5, it is necessary to measure the time intervals between the zero points and the first samplings and to expand these intervals by a factor of two. A more faithful reproduction of a wave is possible when the method of FIG. 5 is used.

Figure 6:
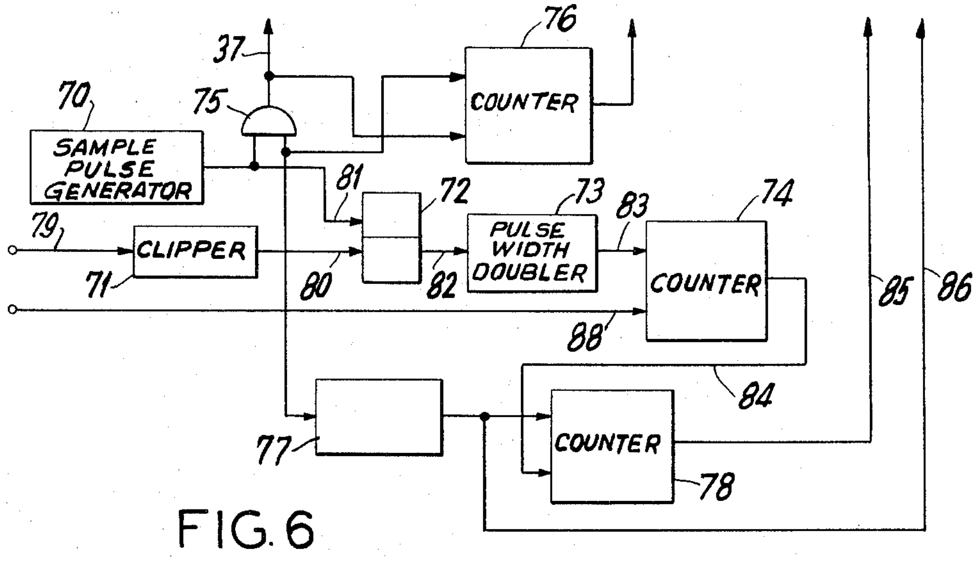
FIG. 6 shows another example of an embodiment of the block 44 of FIG. 3.

The preferred apparatus for carrying out the process of FIG. 5 is similar to the apparatus of FIG. 3 described above, except that a different control means 44 is employed. FIG. 6 shows an example of a control means suitable for the process of FIG. 5. As in the apparatus of FIG. 3, the wave 362 of FIG. 5 is fed to the input terminal 45. The wave 365 is produced at the lead 46. At the lead 48 of FIG. 3, the wave 370 is produced. At the lead 51 of FIG. 3, the wave 364 is produced, and at the lead 54 the wave 369 is produced. The terminal 79 in FIG. 6 is connected to the terminal 48 in FIG. 3, and the wave 362 is, accordingly, fed thereto.

Leads 80, 81, 82, 83, 84, 86 and 87 produce waves 363, 361, 366, 367, 368, 369 and 364, respectively. The reference number 70 in FIG. 6 indicates a sampling pulse generator, and the output thereof feeds an AND gate 75 and an astable multivibrator 72. The input wave 362 is fed to a deep clipper or polarity indicating circuit 71, the output of which is fed to a one-period-gating-circuit including elements 72, 75 and 77. Reference number 76 indicates a counting circuit, and reference number 73 indicates a circuit for doubling the pulse width controlled by the output of the multivibrator 72. The output of the doubler 73 feeds another counter 74. The output of circuit 77 together with the output of counter 74 feeds still another counter 78.

Figure 7:
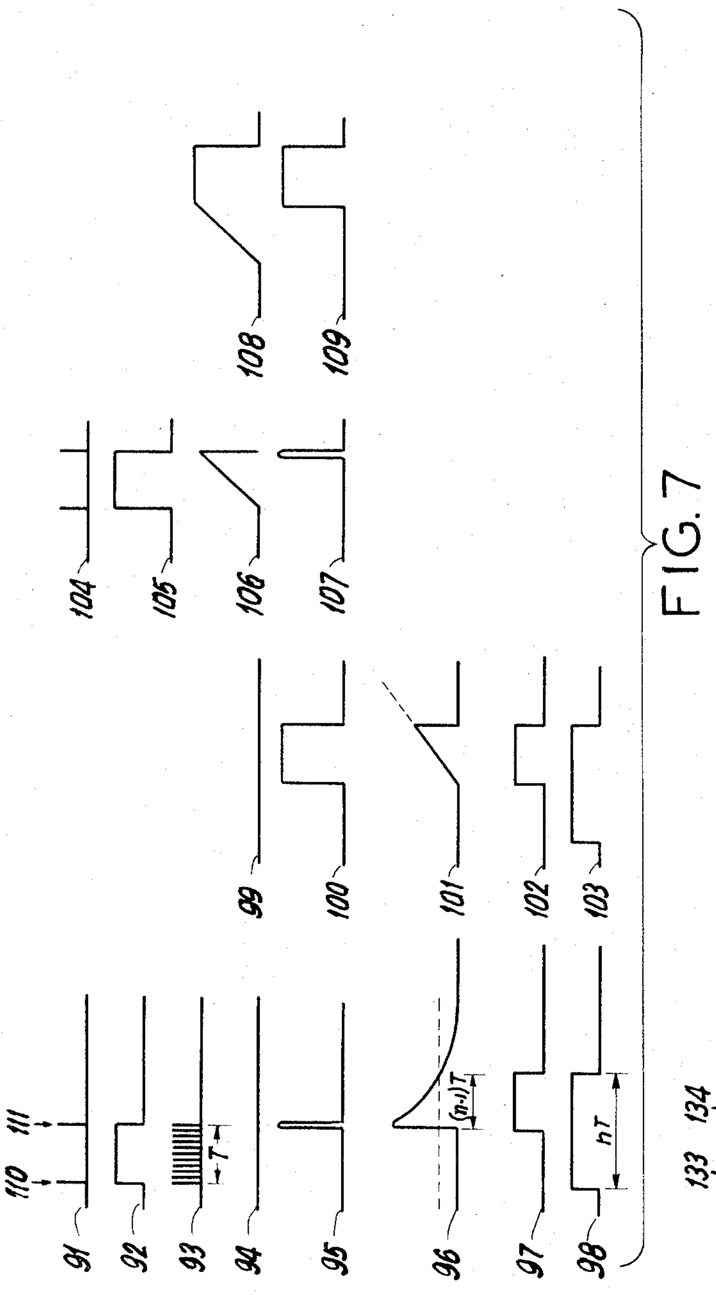
FIG. 7 shows wave forms to explain the operation of an apparatus which compresses or expands the duration of pulses.

An example of a process for doubling the pulse width 73 will be explained with reference to FIGS. 7 and 8. FIG. 7 illustrates several methods for multiplying the interval T between pulses 110 and 111 of a wave 91. The time interval is converted to a voltage. The wave 91 is converted to a wave 92, which serves as a gating signal to produce a pulse wave 93. The pulse wave 93 is converted to a voltage by a D-A converter. Alternatively, a wave 104, identical to wave 91, can be converted to a wave 105, which is integrated to produce wave 106 or wave 108, from which a voltage, 107 or 109, respectively, is produced. Other schemes can, of course, be employed for the purpose of converting the time to a voltage. Then, in FIG. 7, the voltage wave 95 is integrated by a CR circuit to produce a wave 96. The wave 96 is fed to a Schmidt trigger circuit whereby it is triggered at the time $(n\text{-}1)$ T to produce a wave 97. This wave 97 together with the wave 92 will produce a wave 98. The duration of a single pulse of the wave 98 is $n$T. Alternatively, the wave 95 can be changed to a wave 100 which is then integrated to produce a wave 101 which is applied to a Schmidt trigger circuit as before at a time $(n\text{-}1)$ T. This produces a wave 102. Combining waves 102 and 92, a pulse having a duration nt will be produced.

Figure 8:
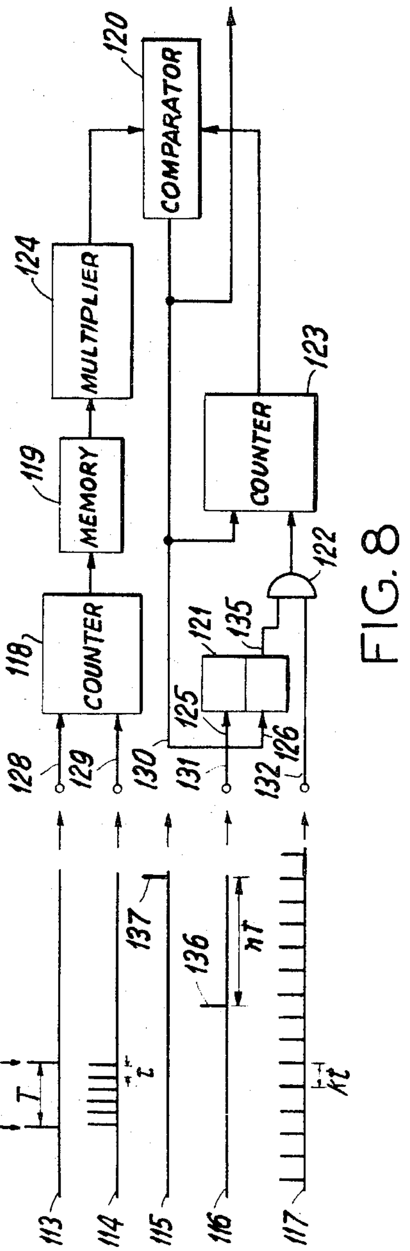
FIG. 8 shows an example of an apparatus, with accompanied wave forms, which is capable of compressing or expanding the duration of pulses.

FIG. 8 illustrates another example of a circuit which can be used to change the pulse duration to $n$T, where $n$ is an arbitrarily selected positive number. A pulse 113 in a series of pulses 133, 134, ... has a period T. A wave 113 together with a count pulse series 114 having the period of $\tau$ is fed to a counter 118. The counted output is fed to a memory 119. Then a wave 116 including a pulse 136 is fed to the reset terminal of a bistable multivibrator 121 which is set to the (1) state. Then counting pulse series 117 having pulses with a period of $k\tau$ is fed to a counter 123 via an AND gate 122. Meanwhile, the output from the memory 119 is multiplied by the pulse number via the pulse multiplier 124. The comparator 120 compares the inputs from 123 and 124 and produces an output when both inputs are equal, thus setting the multivibrator 121 to the (0) state, and the counter 123 is reset to stop counting. The comparator 120 may be of the analogue or the digital type. Thus, the interval between pulses 136 and 137 becomes $kxlT=nT$.

Figure 9:
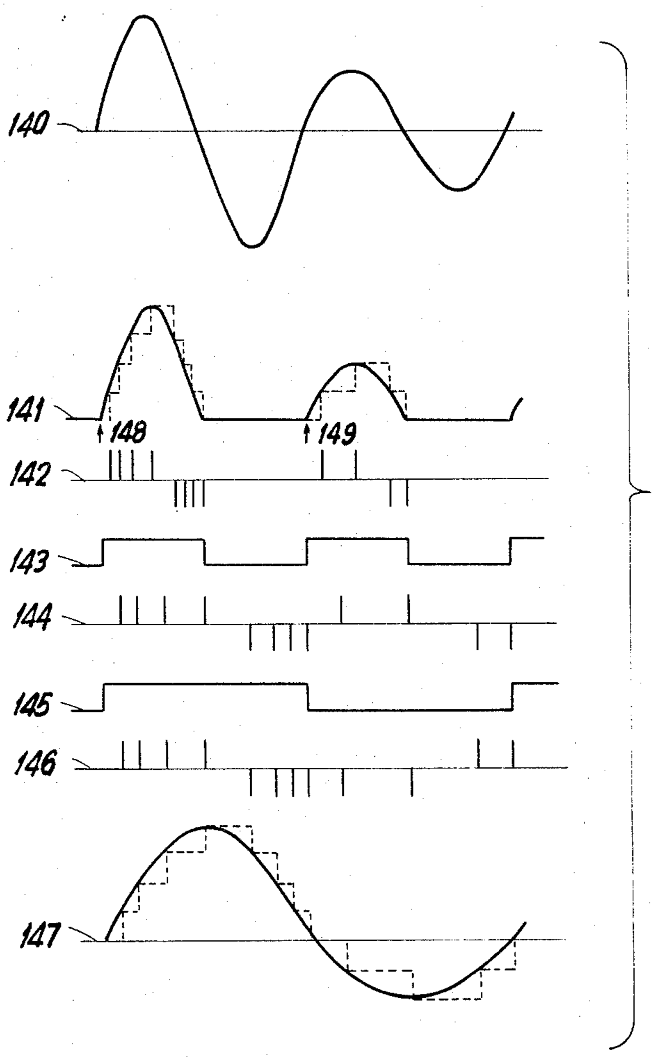
FIG. 9 shows examples of wave forms which illustrate a process that produces the wave form 3 from the wave form 1 of FIG. 1.

FIG. 9 shows another way to produce a wave such as wave form 3 of FIG. 1. The original wave 140 is delta modulated to produce a wave 142. The distance between the pulses of the wave 142 is doubled by means of the apparatus described above to produce a wave 144. A wave 146 is produced from the wave 144 and the wave 145 which is a one period gating pulse. The resulting compressed analogue wave 147 is produced directly by a delta demodulator.

Figure 10:
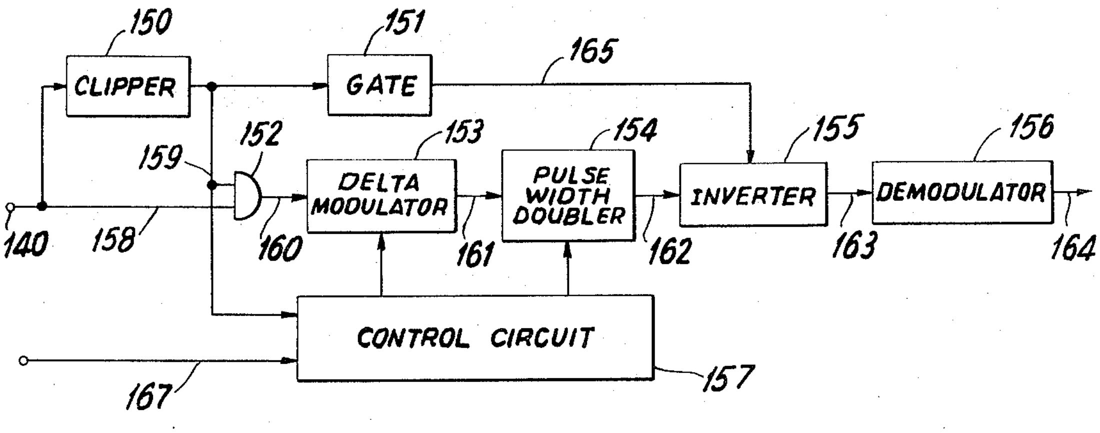
FIG. 10 shows a schematic of an exemplary apparatus for carrying out the process of FIG. 9.

In FIG. 10, the input wave 140 is fed to a deep clipper 150, the output of which is fed to a one-period-gating-circuit 151, an AND gate 152, and further to a control means 157. A delta modulator 153, the output of which is fed to a pulse width doubler 154, is controlled by the control means 157 and receives the input of the AND gate 152. The output of the doubler 154 is fed to an inverter 155 the output of which is fed to a demodulator 156. Clock pulses are received by an input lead 167. Connecting leads 160, 161, 162, 163, 164, 159 and 165 carry wave forms 141, 142, 144, 146, 147, 148 and 145, respectively.

Figure 11:
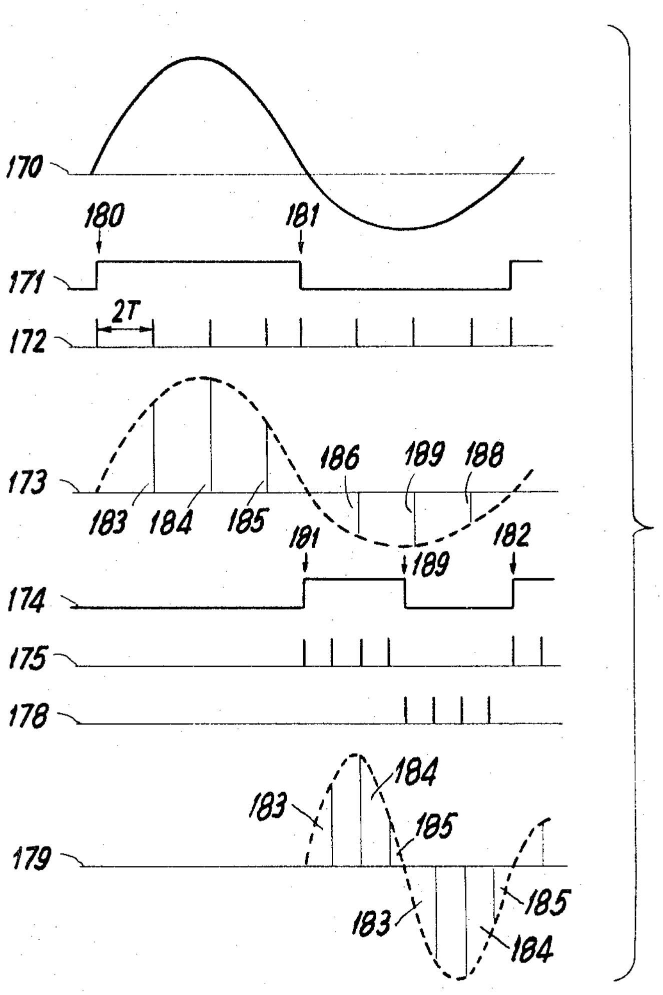
FIG. 11 illustrates an exemplary process which produces the wave form 5 from the wave form 3 of FIG. 1.

The following discussion will explain the receiving or reproducing process for signals transmitted with a compressed band in the manner described above. FIG. 11 shows an example of a receiving or decoding process. It will be noted that a completely reversed process is utilized, compared to that of FIG. 2. A wave 170 is fed as an input. Then it is clipped deeply to produce a wave 171. A sampling pulse series 172 is gated by the wave 171 to produce a sampled wave 173 containing signals of 183, 184, ... 188, ..., which are stored in a buffer memory that may be of the analogue or the digital type. The time interval between signals 181 and 182 is divided by two, by the process described above, to produce a wave 174. From this wave 174, two read out pulse series 175 and 178 are produced. The wave 175 calls for the positive half wave with signals 183, 184 and 185 to be read out of the buffer memory. The wave 178 calls for the subsequent negative half wave. Thus, a regeneration of the original wave is accomplished.

Figure 12:
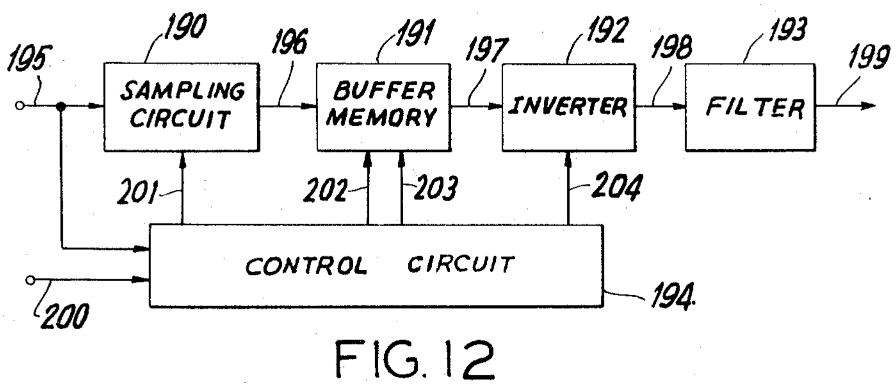
FIG. 12 shows a schematic of an exemplary apparatus which produces the wave form 5 from the wave form 3 of FIG. 1.

FIG. 12 shows, in block form, a schematic of an apparatus for performing the process of FIG. 11. The input signal is received at a terminal 195. The output of a sampling circuit 190 is applied to a buffer memory 191. A control circuit 194 controls an inverting circuit 192 together with the sampler 190 and the memory 191. The output of the inverter 192 (which receives the output of the memory 191) is fed to a low-pass or band-pass filter 193. A clock pulse input terminal 200 is connected to the control unit 194.

Figure 13:
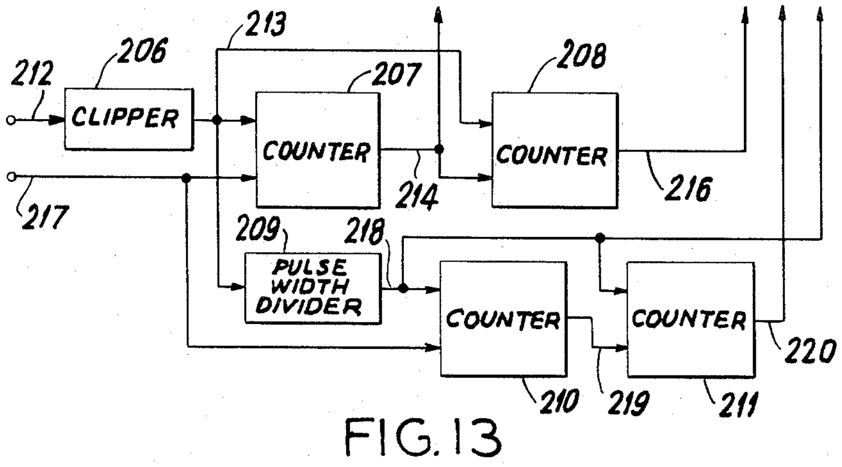
FIG. 13 shows the block 194 of FIG. 12 in greater detail.

FIG. 13 shows, in greater detail, the control circuit 194 which is similar to that of FIG. 4. A polarity discriminator or deep clipper 206 and a plurality of counting circuits 207, 208, 210 and 211 are provided along with a pulse width dividing circuit 209. The wave 170 is fed to the input terminal 195 in FIG. 12. The wave 173 appears on a lead 196 and the wave 179 appears on a lead 198 in FIG. 12. In FIG. 13, the wave 170 is fed to the input terminal 212 and the wave 171 appears on line 213. The wave 172 appears on lead 214 and the wave 174 appears on lead 218. The waves 175 and 178 appear on lead 218.

produced wave is obtained by bisecting the interval between signal level changes 180 and 181 in FIG. 11. The process of FIG. 14 will regenerate the original wave form more accurately because errors in zero point location are reduced.

Figure 15:
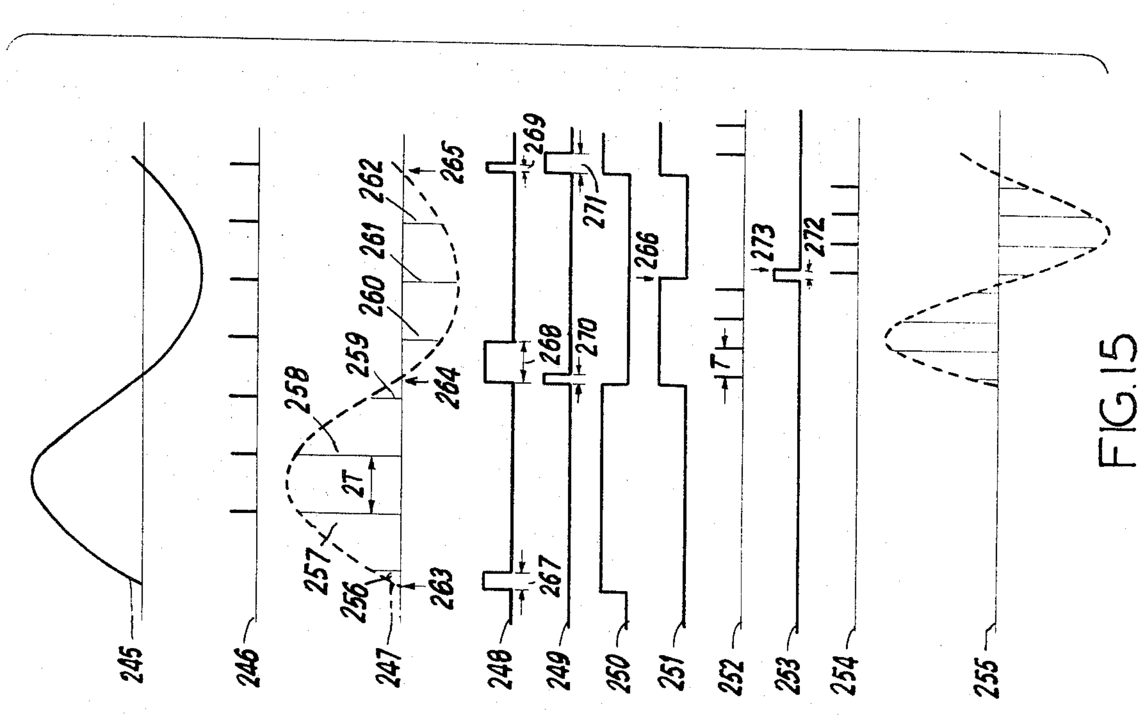
FIG. 15 also shows wave forms which illustrate another exemplary process that constructs the wave form 5 from the wave form 3 of FIG. 1.

FIG. 15 shows another method for decoding the transmitted signal and reproducing the original wave form. It is the reverse of the process of FIG. 5. A coded input wave 245 is sampled at regular intervals defined by sampling pulse series 246 to produce a wave form 247. Sampled signals 256–262 are directly stored into a buffer memory. Then it is necessary to reduce the intervals between the sample pulses. In this case the sampling is performed regularly, so it is necessary to measure the distance between zero points, 263, 264, 265,... and samples 256, 258, 260, 262.... respectively and to reduce these intervals by a half. For this purpose, a wave 248, which indicates the spacing between zero points and samples, is connected to a wave 249 with pulses having a half width by the method described with respect to FIG. 8. (Half the width of interval 267 is interval 270 and half the width of interval 268 is interval 271.) Also, the wave 250 is reduced in its pulse width by a half by the method as described referring FIG. 7 and FIG. 8. Thus, at a time 266 the pulse 272 of the wave 253 is produced with pulse width which is half of that of the pulse 267. From the trailing edge of wave 249, pulse series 252 with a period T, which orders regeneration of the positive half wave, is produced. In this way the reproduced wave 255 is obtained by reading information out of the buffer memory.

Figure 16:
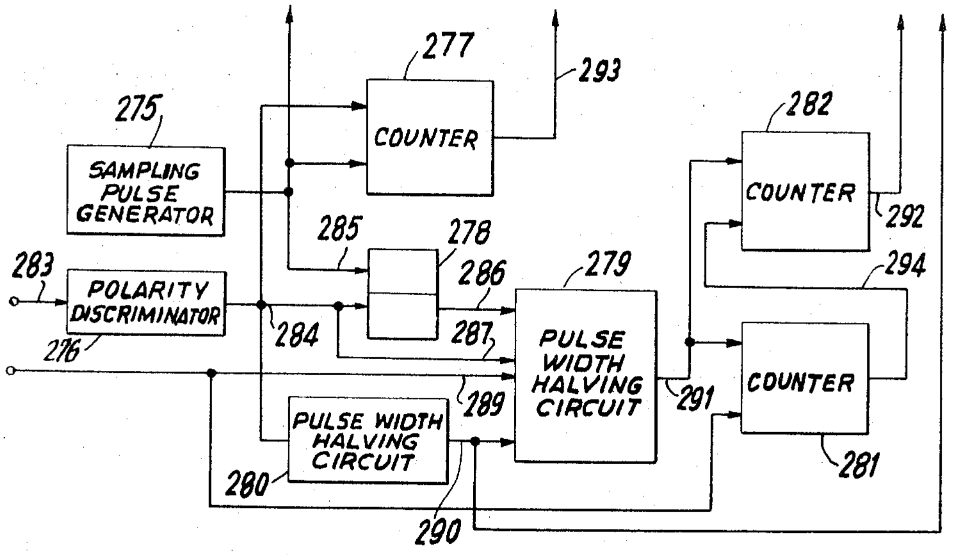
FIG. 16 shows a portion of an exemplary apparatus for performing the process of FIG. 14.

An apparatus for perfoming the process described above is shown in FIG. 12. An example of a control means 194 for this apparatus is shown in FIG. 16. A sampling pulse generator 275 is provided. A polarity discriminator 276 is connected to an input terminal 283. Counter circuits 277, 281 and 282 and a flip-flop circuit 278 are also provided as pulse width halving circuits 279 and 280. Clock pulses are received through an input terminal 289.

Corresponding waves and leads of FIGS. 12, 15 and 16 appear in the same vertical columns of the following table:

| | | | | | | | | | | |
|---|---|---|---|---|---|---|---|---|---|---|
| FIG. **12** leads: | 195 | 196 | 198 | 201 | ........ | ........ | ........ | ........ | ........ | ........ |
| FIG. **15** waves: | 245 | 247 | 225 | 246 | 250 | 248 | 249 | 251 | 252 | 254 |
| FIG. **16** leads: | 283 | ........ | ........ | 285 | 284 | 286 | 291 | 290 | 294 | 294 |

Figure 14:
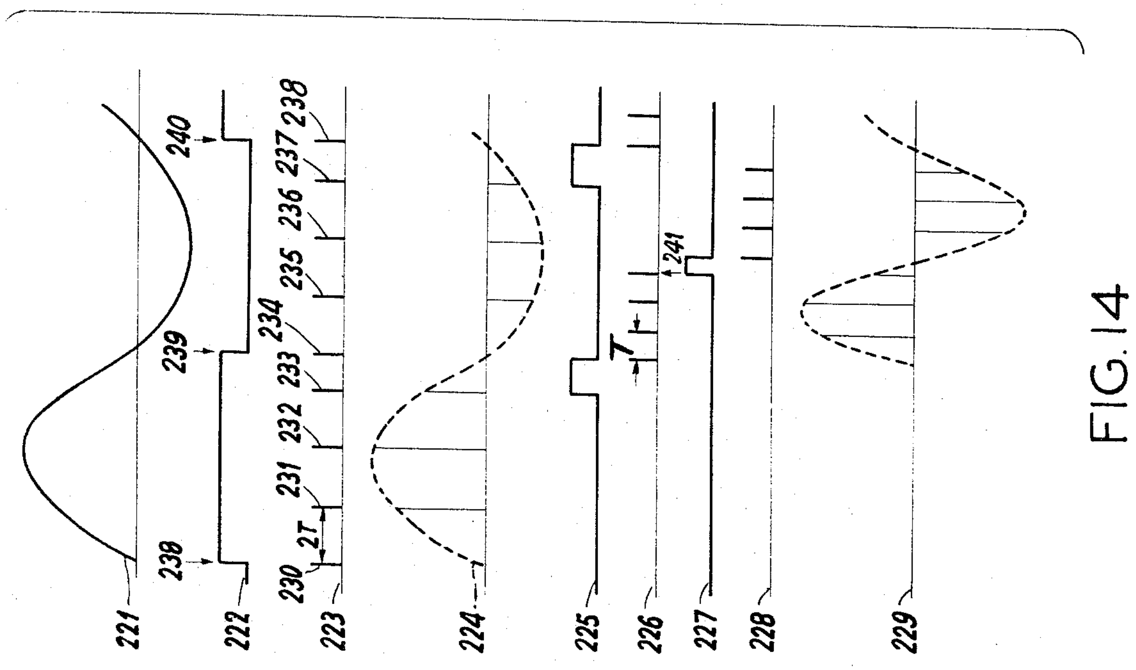
FIG. 14 shows wave forms which illustrate a process for producing the wave form 5 from the wave form 3 of FIG. 1.

FIG. 14 shows a modification of the method of FIG. 11. Waves 221 through 224 are identical to waves 170 through 173 of FIG. 11, respectively. In this case, however, the interval between the last sampling pulses 233, 237,... and the zero points 239, 240,... are measured to produce a wave 225, and a read out order pulse series 226 having a period T is produced from the trailing edge of the wave 225. After the number of pulses 230,... 235, 234...237 coincides with the number of pulses of 226 (in this case, after counting 4 pulses), the pulse series 226 is interrupted at a time 241. The width of the wave 225 is reduced by a half by the method of FIG. 8, and this reduced width pulse is transferred to time 241 (wave 227). From the trailing edge of pulse 227, a pulse series 228 is produced having a period T. Waves 226 and 228 correspond, respectively, to waves 175 and 178 in FIG. 11. The regeneration of the input wave in substantially its original form is performed thereafter in a manner similar to that used in the process of FIG. 11. The process described above is different from that of FIG. 11 in that the zero point of the re- For example, the wave carried by the lead 195 is wave 245 of FIG. 15 and this lead corresponds to 283 in FIG. 16.

Figure 17:
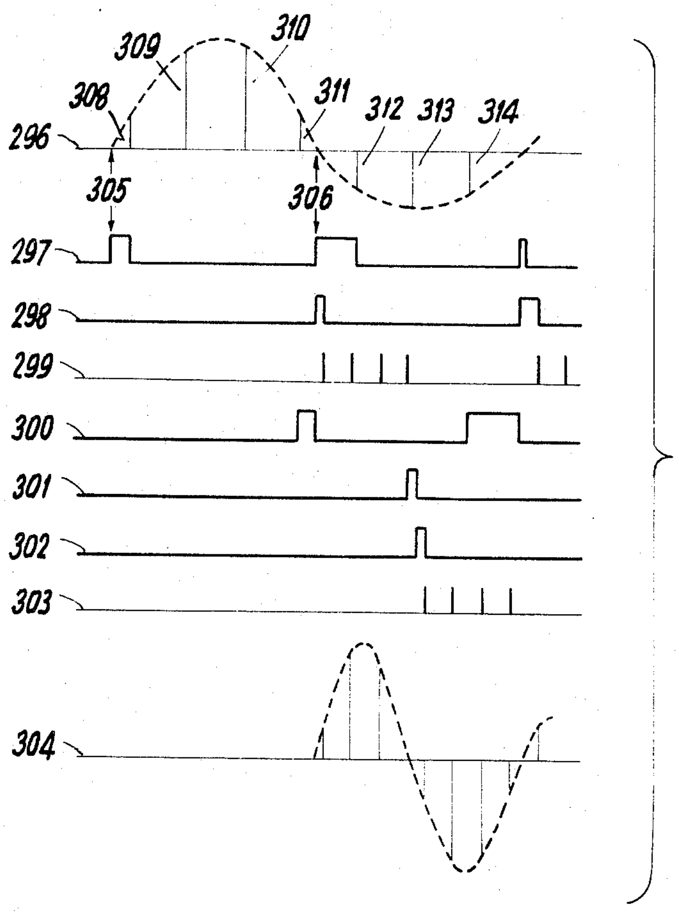
FIG. 17 shows examples of wave forms that illustrate a process which yields the wave form 5 from the wave form 3 of FIG. 1.

FIG. 17 shows a process analogous to that of FIG. 15. In this case, however, the time intervals counted and halved are between signals 305 and 308, 311 and 306, 306 and 312, 314 and 307. In FIG. 15 the intervals were between 263 and 256, 264 and 260, 263 and 264, 264 and 265.

Figure 18:
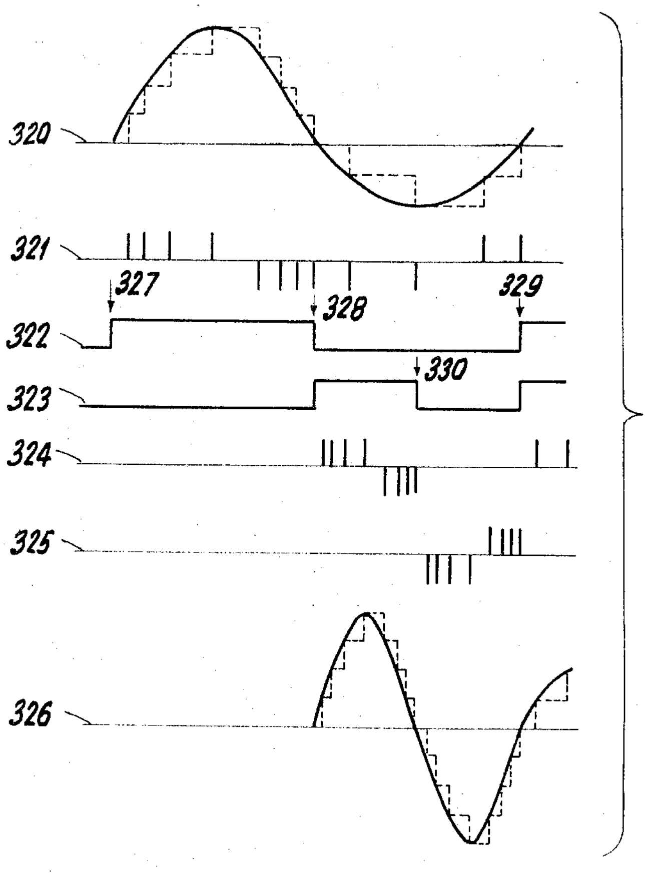
FIG. 18 shows another example of wave forms that illustrate a process which produces the wave form 5 from the wave form 3 of FIG. 1.

FIG. 18 shows wave form diagrams. An input wave 320 is delta modulated to produce a wave 321 and which is fed to a buffer memory. The intervals between pulses of this wave are halved by the method described above in connection with FIGS. 7 and 8 with time standards 328, 330 and 329 to produce waves 324 and 325. Through delta demodulation, wave 326 is obtained.

Figure 19:
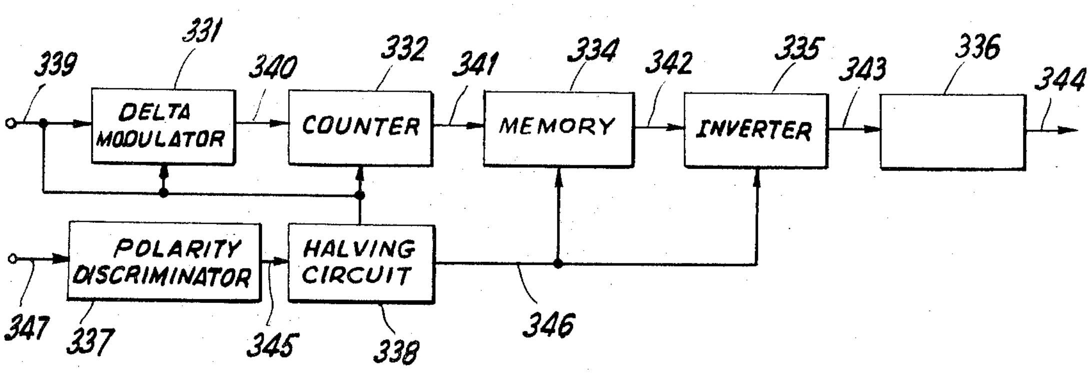
FIG. 19 shows, in schematic form, an example of an apparatus for carrying out the process of FIG. 18.

FIG. 19 shows an example of an apparatus suitable for the process of FIG. 18. The wave 320 of FIG. 18 is fed to a delta modulator 331. The output of the modulator 331 is fed to a counter 332 and the resulting signal is fed to a buffer memory 334 which may be of the analogue or the digital type. The wave carried by the lead 340 is designated by 321 in FIG. 18. The waves carried by the lead 342 are designated 324 and 325. An inverter 335 is driven from the lead 346 which carries the wave 323 produced by a circuit 338 which halves time intervals as described above. A polarity discriminator 337 drives the circuit 338. The lead 345 carries the wave 322 from the discriminator 337 to the circuit 338. The wave 326 is supplied to the output lead 344.

Figure 20A:
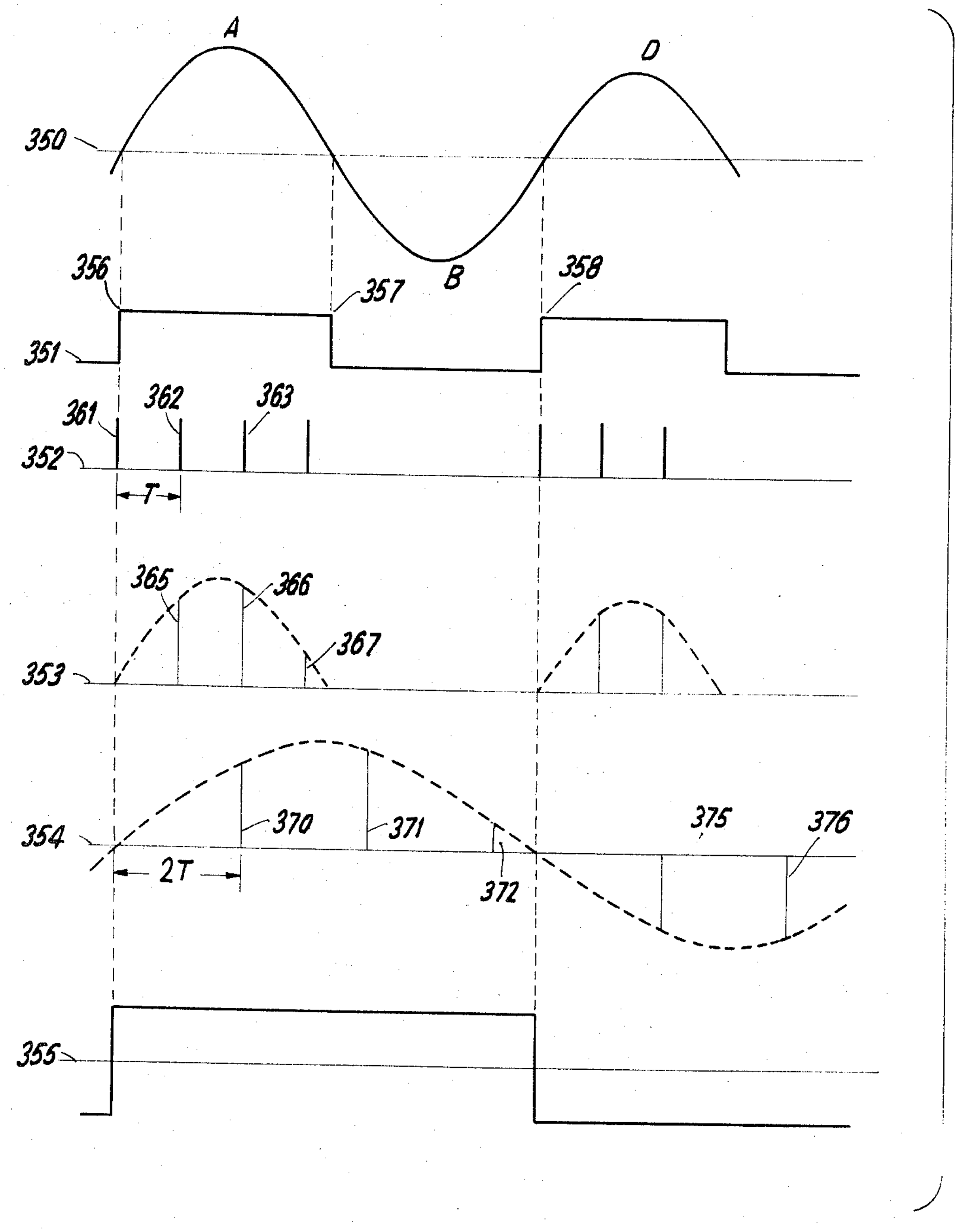
FIGS. 20*a* and 20*b* show wave forms produced in accordance with another embodiment of the invention.

FIG. 20*a* relates to still another embodiment of the present invention. An original wave 350 is deeply clipped to produce a wave 351. The wave 350 is sampled from approximately the first rise time 350 with a period T as shown by wave form 353 under the control of the waves 351 and 352. The sampling is performed during the recurring positive half cycles, e.g., between the level changes 356 and 357 of wave 351. The wave 353 is fed to a buffer memory of the analogue or the digital type as before. The signals 365, 366, and 367 are thus stored in the memory and read out with a period 2T as indicated by sampled pulses 370, 371 and 372 of a wave form 354. Then at the time point 358, one period after the first zero point 356, (by utilization of the wave 355) the polarity of the output from the memory is reversed. The buffer memory then stores signals derived from the portion D of wave 350 in much the same manner as in the case of the earlier portion A. Thus, signals 375, 376 and 377 are produced which are the expansion of part D of wave 350. However, the time position is correct for the wave 354 in contrast to the case described above. The advantage of this process is that there is no necessity for measuring the time intervals, and yet it is possible to produce waves with accurate zero points.

Figure 21A:
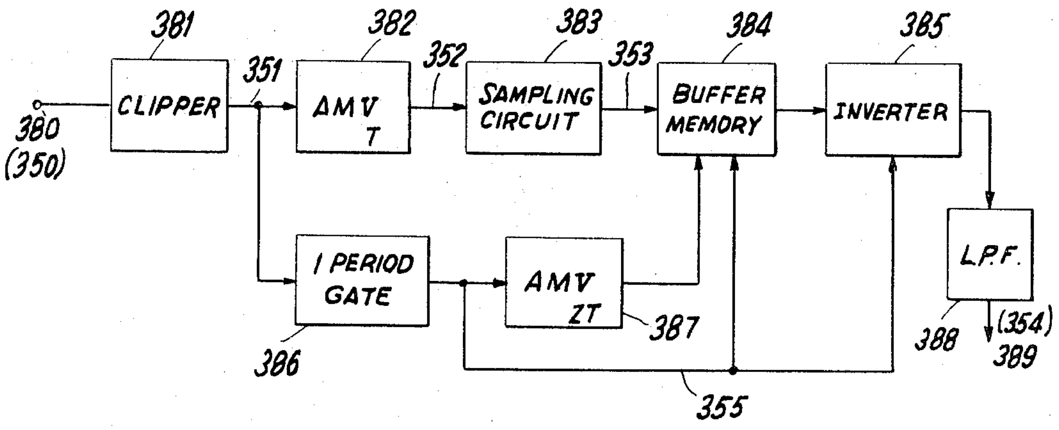
FIGS. 21*a* and 21*b* show, schematically, exemplary apparatus that can be used to produce the wave forms shown in FIGS. 20*a* and 20*b*, respectively.

FIG. 21*a* shows an apparatus for performing the process of FIG. 20*a*. The wave 350 is fed via, an input terminal 380, to a deep clipper 381 to produce the wave 351, which is fed to an astable multivibrator 382, thus producing the wave containing sampling pulse series 352. The wave 352 is fed to a sampling circuit 383, the coded output of which is stored in a buffer memory 384. The output from clipper 381 is modified to wave 355 by the one-period-gate 355 which also controls the memory 384 and an inverter 385. The readout from buffer memory 384 is effected by pulses with a period 2T produced from another astable multivibrator 387. The astable multivibrators 382 and 287 will produce pulses with approximately period T or 2T after the zero points, thus effecting the aforesaid operations. Of course, other suitable means may be employed instead of the astable multivibrator which is capable of producing pulses after a constant time delay following a trigger which may be impressed by the rise time 356, etc. The constant time is preferably small. If the time delay is appreciable, the time should be doubled for the gating means of period 2T. Usually the delay will be negligible when compared with T. A blocking oscillator or other quasistable trigger circuit may be used. Also a pulse series having a period smaller than T may be gated periodically, the gating being triggered with a period T or 2T.

The read out signals from the buffer memory 384 are thus effected with a period 2T with the aid of inverter 385 to produce wave 354 which, if necessary, is fed to a low or band pass filter 354 and eventually to output device 388. This is a coded signal which has been distributed over the sampled and not sampled portions of the original wave.

Figure 20B:
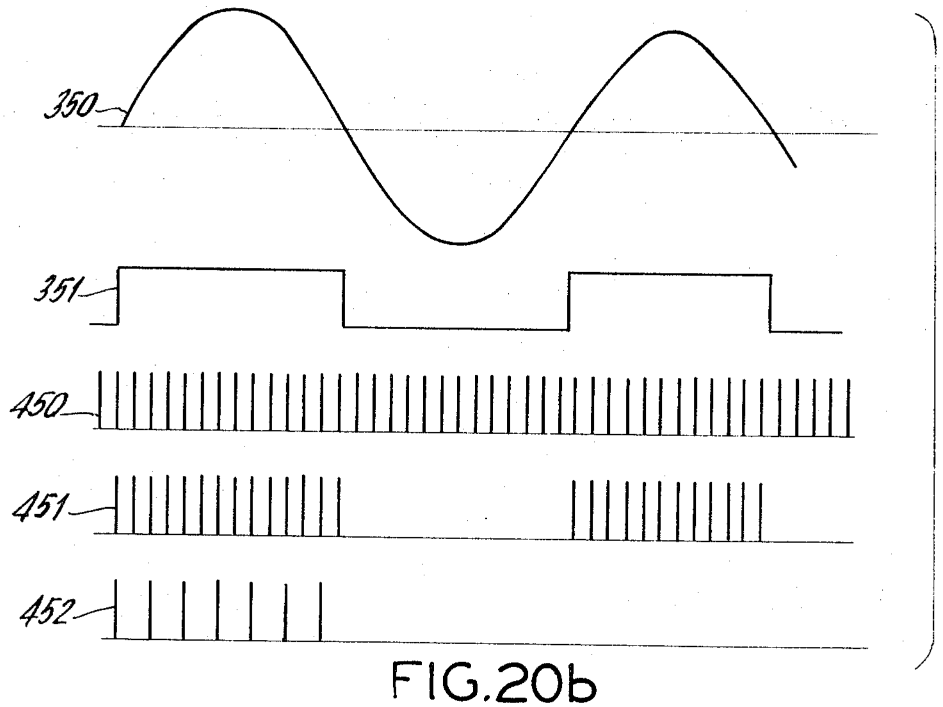

FIG. 20*b* shows a slight modification of FIG. 20*a* The wave 350 is clipped as before to produce a wave 351. A pulse series 450 having period $\tau$ is gated by the wave 351 to produce a wave 451. The period of this pulse series is selected to be smaller than T. The wave 451 is counted down to produce a wave 452 with a period T. The error of the zero points will be no more than $\tau$, the period of the pulse series 450. Therefore, the smaller $\tau$ becomes, the smaller the error becomes. The process after the formation of wave 452 may be similar to that of FIG. 20*a*.

Figure 21B:
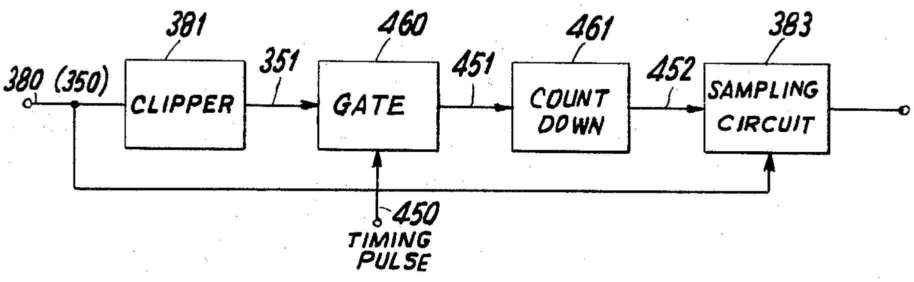

FIG. 21*b* shows an essential part of the apparatus embodying the above modification. After clipping, the input wave is fed to a gate 460 where the timing pulse series 450 is gated to produce the wave 451. Then, the wave 451 is counted down in counter 461 to produce the wave 452 which is employed to sample the wave 350 by the sample circuit 383 as before. The subsequent process may be similar to that of FIG. 21*a*.

Figure 22:
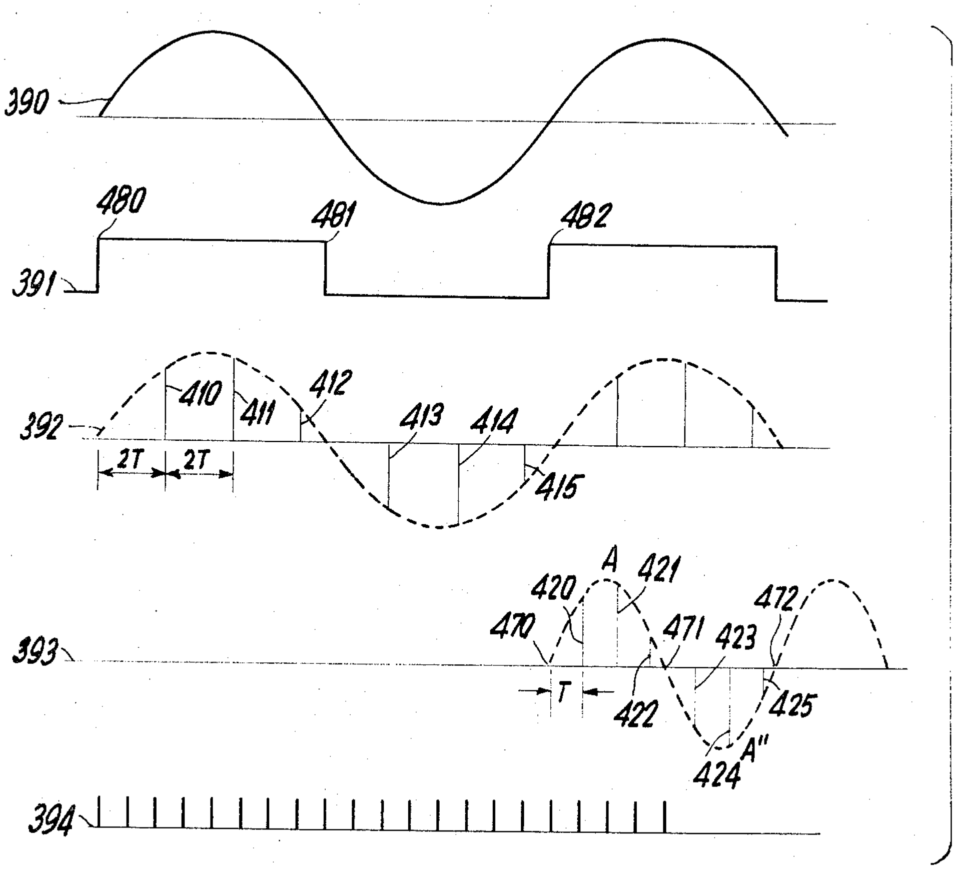
FIG. 22 shows a reproduction process in terms of wave forms corresponding to FIGS. 20 and 21.

The regeneration of the signal will be achieved in a similar fashion as that of any preceeding embodiments. FIG. 22 shows an exemplary regeneration process. An input wave 390 is clipped, as before, and sampled preferably by a technique similar to that described with respect to FIG. 21. Thus the samples are produced from zero points almost exactly as shown by wave 392. In this way the desired distributed coded signal is produced. The reproduction of the original wave is preferably commenced from zero points occurring one or more periods after the initiating time of the wave 392. Therefore, the necessary number of signals to be stored in the buffer memory should be chosen with reference to the lowest frequency component to be dealt with. The reproduction of signals may be performed with a period T which may be produced by the count down process from the pulse series of period 2T as shown by part A of wave 393. In this case, however, the interval between level changing 480 and 481 should be halved to provide a time point 471 which is in the middle point of the reproduced wave beginning from point 470 and ending at point 472 on the wave 393. For this purpose a timing pulse series 394 may be employed to count the intervals and to determine the point 471. In other words, the count between 480 and 481 of wave 391 may be divided by two to provide counting from the points 470 and 471. After point 471 the signals are inverted to produce a negative wave A''.

Figure 23:
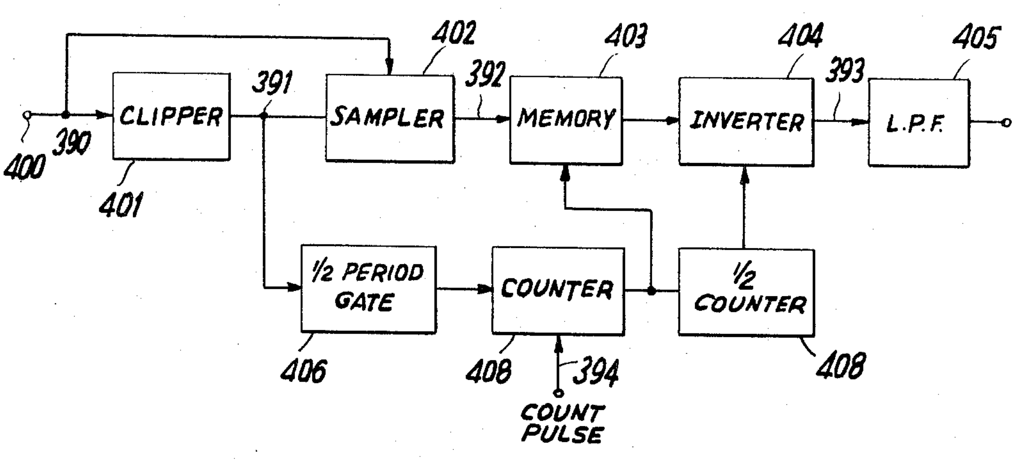
FIG. 23 shows apparatus used in carrying out the process of FIG. 22.

FIG. 23 shows an example of an embodiment of the invention suitable for performing the process of FIG. 22. The wave 390 is fed via input lead 400 to a clipper 401 which produces the wave 391 of FIG. 22. A sampler 402 produces sampled signals which initiate from a zero point 480 by the process described above with respect to FIGS. 20 and 21. The samples are fed to a buffer memory 403 which produces signals controlled from counter 407 regulated by a half period gate 406. Thus, the signals derived from buffer memory 403 and via a controlled inverter 404 will form a wave 393, which is then, if necessary, fed to a low or bandpass filter 405. The output of the reproducing apparatus is derived from this filter. It is a coded signal that has been distributed over the intervals of the sampled and not sampled portions of the original wave. Of course, other reproducing processes such as those described above may be employed and such reproduction process may be applied to other transmitting processes.

Figure 24:
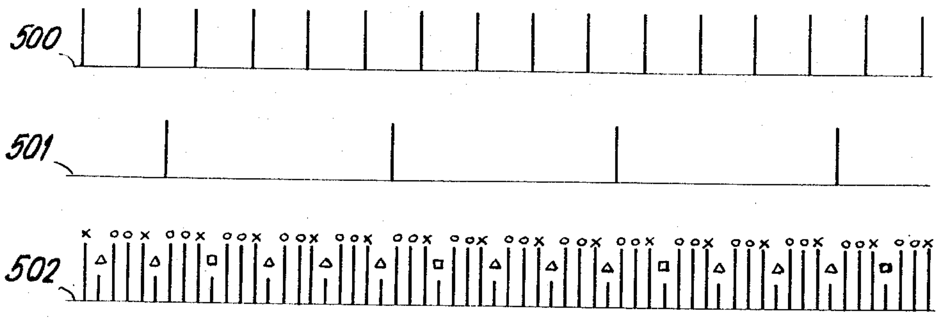
FIG. 24 shows exemplary wave forms illustrating the transmitting pulse series of the present invention.

When performing the method of the invention, the voice frequency band can be split into a plurality of frequency bands, e.g., one band being 300–850 Hz, and another band being 850–3,400 Hz. The former is sampled at a 2 kHz rate and with six bits and the latter is sampled at an 8 kHz rate and with four bits. FIG. 24 shows the arrangements of other pulse series. A wave 500 includes 8 kHz samples and, wave 501 includes 2 kHz samples. The composite wave, is designated 502. The pulses denoted by 0 are the four bit pulses at 850–8,400 Hz. Δ denotes pulses of the 6 bit signals at 300–850 Hz. X and denote polarity identification pulses for 850–3,400 Hz and 300–850 Hz signals, respectively. The signal contains 32 bits per second overall.

The transmission system according to the present invention has been described separately with respect to transmission and reception. Each transmission or reception process described may be combined with any other process of reception or transmission.

The embodiments shown above are described based on a standard keyed to zero points of the wave. However, other standards based on, for instance, the maximum or minimum point may be utilized. Those points are in a relationship of differentiation or integration of a wave form and can be located by a conventional differentiater or integrater.

It is possible to extract a quarter period instead of a half period and distribute it over other parts of the period, i.e., a half period or a full period. Furthermore the compression or expansion is not limited to a factor of two. It is also possible to compress or expand by a factor $n$, which is a positive number not limited to an integer. Alternatively, it is possible to remove an arbitrarily selected part of a semiperiodic signal, transmit it during more than one period, and then reproduce the omitted part from the selected part. However, positive and negative half cycles have desirable correlations in the case of sound waves.

It is also possible to omit the step of inserting the negative (or positive) half cycles such as, for example, part A in FIG. 22. The wave reproduced through integration will then have the shape of the rectified half wave 4 of FIG. 1 which will contain even order harmonics. At times this may be tolerated in view of the anticulation required. Furthermore, such distortion can be suppressed by proper choice of the wave separation technique. In other words, if the even order harmonics fall out of the frequency band, there is no distortion. For example, even order harmonics arising from 200–390 Hz fall outside the band. Generally speaking, for the lower frequency $f_1$ the upper frequency should be chosen lower than $2f_1-q$, and $q$ should be larger than the width of cut off region. By this arrangement, the number of bands to be split may increase, but, the merits of simplification must be considered. The above arrangement is also applicable to the transmitting process; however, it is less advantageous there.

The present invention enables one to vary the frequency band of an approximately period signal by a factor $n$. The aforesaid embodiments are also capable of many other applications. For instance, the shift in voice frequency that occurs under deep water can be corrected by the process shown by wave form 1 to 3 in FIG. 1 and by the apparatus described above with reference to several embodiments. In the same manner, a voice frequency can be shifted upward or downward as desired in real time. For the purpose of upward shifts, the process from waves 3 to 5 of FIG. 1 is used and for downward shifts the process from waves 1 to 3 of FIG. 1 is used. These processes can be repeated if necessary. The articulation will not be deteriorated greatly by such frequency shifting.

For the purpose of public address systems, the voice frequency can be shifted to a desirable level which prevents houling and reverberation. It is even possible to control automatically the upward or downward shift of the voice frequency sensed from the detected reverberations, etc. For such purposes, of course, other systems for frequency shifting or band limiting technique are also useful.

Figure 25:
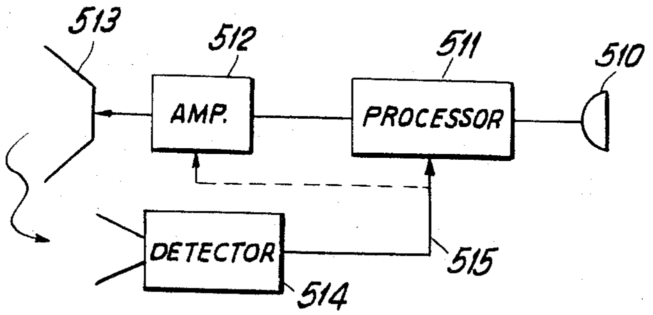
FIG. 25 shows, schematically, a public address system in accordance with the invention, adapted to modify voice frequencies.

FIG. 25 shows an exemplary embodiment of the above described system. A microphone 510 is connected to a processor 511 which is controlled from a detector 514, which, for example, detects reverberations, in accordance with the circumstance, of the sound field radiated from a loudspeaker 513 energized by an amplifier 512. The processor 511 may be simply a tone controller of known type. Of course, the amplifier gain can also be controlled as shown by dott lines.

The coded signals described above may be transmitted without distribution over the portions of the signal that are not sampled, i.e., they may be transmitted directly within a time slot and the vacant intervals between the sampled portion of the signal may be occupied by another signal to form a time division multiplex communication system.

The signal processed as described above may be applied not only for voice frequency but also it is applicable to other waves having rough periodicity or redundancy.

It is also possible, according to the invention, to introduce a negative feedback (NFB) means as is common in communications systems. Because of the time delay due to the process as above written, the NFB may be effective for the duration of a vowel. The process of FIG. 20 is suitable for making the delay smaller. When applied to a fast varying wave form, NFB then may produce distortion and can be suppressed by a switching means operated by a wave form detector. This situation may arise during transition from a consonant to a vowel and can be detected by a frequency discriminator to operate the switch means.

Figure 26:
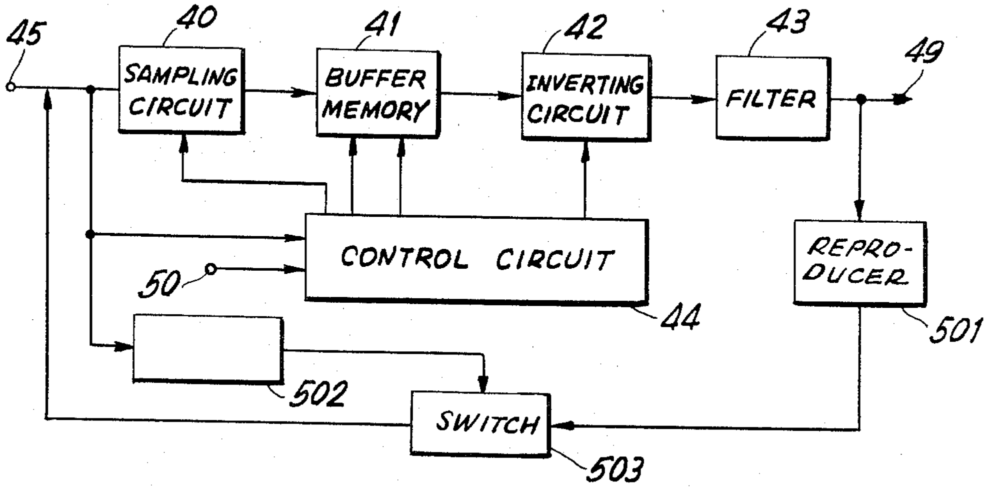
FIG. 26 shows an example of the negative feedback system in accordance with the present invention.

FIG. 26 shows an example of an NFB arrangement. Elements 40 to 49 are identical to those shown in FIG. 3. A means 501 for reproducing the signal, such as that explained with reference to FIG. 12, which preferably is identical to the real reproducer of the system, is provided. A switch 503 is controlled via a detection means 50 responsive to the frequency change rate.

Of course, known means for NFB usually employed for PCM or delta modulation can be introduced in addition to above scheme utilizing a local demodulator. The problem of the synchronization may be similar to that used in a conventional PCM system etc.

For the purpose of stenography and language study, a sound tape recorder may be driven slowly and its output can be shifted upward in frequency to reproduce the sound in the original frequency region. This can perform the function of lowering the speech speed of a person.

The symmetricity of the sound wave will be more precise if the frequency band is split into a plurality of bands. However, a band split is not always necessary if proper sampling is used.

In some applications of the invention, the additive half period produced from the preceding half period as described before may not always be similar in amplitude to that of preceding one. It may sometimes be desirable to attenuate the subsequent additive wave exponentially.

The analogue-to-digital convertor, which is used in the embodiments described above to sample and to code the samples for feeding a buffer memory of the digital type may be used commonly in a time sharing manner for a plurality of channels split in order to obtain symmetricity of the wave form.

In a digital transmission system embodying the present invention, the well-known compression and expansion of the amplitude level may be introduced as is usual in PCM systems.

The *n-ple* device above described can be changed to a $1/(n+1)$ ple device by known feedback and nonlinear operation techniques. Therefore, a single device can be used for both transmission and reception. Also by this technique, compression or expansion of a non-integer ratio may be achieved.

The above embodiments of the invention are concerned primarily with digital processing. However, it is of course, possible to process wholly or partly in the analogue mode.

While the present invention is described above with respect to specific preferred embodiments, these are shown only by way of example and do not restrict the scope of our invention which is defined by the appended claims.

We claim:

1. A compressed frequency band signal transmission system comprising means for sampling half cycles of an input signal to be transmitted, said sampled half cycles being substantially similar to the half cycles not sampled, means responsive to the sampled half cycles for producing a coded signal, means for distributing the coded signal over the time intervals occupied by the half cycles that are not sampled as well as time intervals occupied by the half cycles that are sampled, and means for regenerating portions of the signal that are not sampled as well as portions of the signal that are sampled from the coded signal.

2. The apparatus of claim 1, further comprising means for determining the time at which sampling of the input signal takes place including a clipper, a flipflop, and circuit means for halving the width of pulses.

3. A compressed frequency band signal transmission system comprising a sampling circuit means which samples a half cycle of an input wave, a buffer memory coupled to the sampling circuit means, an inverter, and a control means for controlling the sampling circuit means, the buffer memory, and the inverter being arranged to produce a coded signal containing information relating to sampled portions of the input wave.

4. The apparatus of claim 3, wherein the control means includes a plurality of counters and a gating-signal generator.

5. The apparatus of claim 3, wherein said control means includes a clipping circuit, an astable multivibrator, a pulse width doubler, a one-period-gate, and a plurality of counters.

6. A signal transmission system comprising means for removing redundant alternate half cycles of a sound wave, and means for expanding the remaining half cycles to distribute them over the intervals occupied by the sampled and not sampled portions, thus dividing in half the frequency of the signal transmitted.

7. The apparatus of claim 6, further comprising a means for producing negative feedback, wherein the means for removing redundant half cycles is responsive to the negative feedback.

8. A signal transmission system comprising, a wave separator, a gating circuit, an analogue-to-digital converter, a plurality of buffer memories, and a control means coupled to the above components whereby alternate half cycles of the wave to be transmitted are sampled and distributed along the time axis over the intervals containing the sampled and the not sampled half cycles.

9. A compressed frequency band voice signal transmission system comprising a means for dividing the voice signal into a plurality of frequency bands, means for sampling alternate half cycles of the voice signal which fall within each band, means responsive to the sampled half cycles of the signal for producing a coded signal, and means for distributing the coded signal derived from each frequency band over the time intervals occupied by the half cycles of the signal in that band that are not sampled as well as the half cycles of the signal in that band that are sampled.

10. The apparatus of claim 9, further comprising an analogue-to-digital converter connected to the sampling means associated with more than one of the frequency bands for converting the sampled hall cycles of the signal to digital form.

11. The apparatus of claim 9, wherein each frequency band of the signal is limited to less than twice of the lowest frequency it contains.

12. In a compressed frequency band signal transmission system, an apparatus for producing a coded signal comprising means for sampling alternate half cycles of an input signal, means responsive to the sampled half cycles for producing a coded signal, and means for distributing the coded signal over the intervals occupied by the sampled half cycles and the not sampled half cycles.

13. The apparatus of claim 12, wherein the sampling means is responsive to the input signal to commence sampling a half cycle at a predetermined position with respect to the zero point of said input signal.

14. The apparatus of claim 12, wherein the each sampled half cycle beging and ends at a zero point of the input signal.

15. The apparatus of claim 12, further comprising means for delta modulating the input signal prior to sampling.

16. The apparatus of claim 12, wherein the sampling means includes a clipper, and the means for distributing the coded signal includes a plurality of gates, a countdown circuit, a buffer memory, and an inverter.

17. In a signal transmission system, an apparatus comprising means for shortening successive half cycles of an input wave containing sound information, means for producing a polarity-inverted half cycle corresponding to each shortened half cycle, and means for inserting the polarity-inverted half cycles between shortened half cycles thereby providing a continuous output wave having twice the frequency of the input wave.

18. A public address system including the apparatus of claim 17, further comprising means for monitoring the sound waves produced by the system, and means for varying the portion of the signal removed in response to the output of the monitoring means.

19. A method for transmitting signals having substantial redundancy and containing sound information, comprising removing substantially redundant alternate half cycles of a sound wave, lengthening the remaining half cycles of the wave whereby its frequency is decreased, recording the wave of decreased frequency, playing back the wave of decreased frequency, regenerating the redundant half cycles of the wave that were removed, shortening the wave to leave spaces between the sampled half cycles, and inserting the regenerated half cycles of the wave in the spaces to substantially recreate the original wave.

* * * * *

UNITED STATES PATENT OFFICE
CERTIFICATE OF CORRECTION

Patent No. 3,784,754 Dated January 8, 1974

Inventor(s) Isamu Hagiwara et al

It is certified that error appears in the above-identified patent and that said Letters Patent are hereby corrected as shown below:

IN THE CLAIMS:

Claim 10, column 14, line 34, "hall" should be --half--.

Claim 14, column 14, line 52, "beging" should be --begins--.

Signed and sealed this 14th day of May 1974.

(SEAL)
Attest:

EDWARD M.FLETCHER,JR.
Attesting Officer

C. MARSHALL DANN
Commissioner of Patents